United States Patent Office 3,132,167
Patented May 5, 1964

3,132,167
PROCESS FOR PREPARING LINEAR SILANOL CHAIN-STOPPED DIORGANOPOLYSILOXANES
Reginald J. Boot, Schenectady, and Arnold Torkelson, Burnt Hills, N.Y., assignors to General Electric Company, a corporation of New York
No Drawing. Filed Feb. 26, 1960, Ser. No. 11,169
6 Claims. (Cl. 260—448.2)

This invention is directed to linear silanol chain-stopped polysiloxanes. More particularly, this invention relates to an improved process for the preparation of linear silanol chain-stopped diorganopolysiloxanes.

Silanol chain-stopped linear diorganopolysiloxanes are finding increased use in the preparation of various silicone products such as elastomers and fluids of certain types. These silanol chain-stopped materials are particularly valuable in the preparation of organopolysiloxanes which are curable at room temperature to solid elastic, rubbery products. For example, in Patent 2,843,555, Berridge, there is shown the preparation of room temperature curing organopolysiloxanes employing silanol chain-stopped diorganopolysiloxanes, alkyl silicates, a filler and certain types of metal salts.

One of the problems encountered in the preparation of the silanol chain-stopped diorganopolysiloxane fluids of the type employed in preparing the compositions of the aforementioned Berridge patent is the control of the characteristics of the silanol chain-stopped material. By processes known to the art prior to the present invention, it has been extremely difficult, if not impossible, to obtain batches of silanol chain-stopped linear diorganopolysiloxanes of reproducible viscosity. Since the characteristics of the final room temperature vulcanizing silicone rubber of the aforementioned Berridge patent is dependent to some extent on the nature of the particular starting silanol chain-stopped material, it becomes extremely important to be able to produce silanol chain-stopped fluids of predictable and reproducible structure.

A number of methods are suggested in the prior art for the preparation of silanol chain-stopped linear diorganopolysiloxane fluids. For example, Patent 2,607,792, Warrick, discloses the reaction of completely condensed organopolysiloxanes with water to produce such materials. However, the process of this Warrick patent requires extremely high pressures and usually results in the formation of silanol chain-stopped diorganopolysiloxane fluids of very low viscosities, such as viscosities below about 100 centistokes when measured at 25° C. In addition, the process of this Warrick patent does not permit the batch to batch preparation of substantially identical silanol chain-stopped fluids.

Another method suggested in the prior art for the preparation of silanol chain-stopped diorganopolysiloxane fluids is by the condensation of various monomeric silanols as shown in Patent 2,416,503, Trautman et al. Again, the process of this Trautman et al. patent is disadvantageous in that it is extremely difficult to obtain reproducible viscosities in the products.

Patent 2,890,188, Konkle et al., suggests the preparation of silanol chain-stopped diorganopolysiloxane fluids by the hydrolysis of various hydrolyzable monomeric silanes. Again, the disadvantage of the Konkle et al. process is that reproducibility of silanol-containing diorganosiloxanes of viscosities in excess of about 1,000 centistokes when measured at 25° C. becomes difficult.

One very satisfactory method for preparing low viscosity silanol chain-stopped diorganopolysiloxanes with reproducibility is by the hydrolysis of chlorine chain-stopped diorganopolysiloxanes. Such chlorine chain-stopped linear diorganopolysiloxanes are prepared by the method of Patents 2,381,366, Patnode et al., and 2,779,776, Hyde et al., by the hydrolysis of monomeric chlorosilanes with less than the amount of water required for complete hydrolysis and condensation. The chlorine chain-stopped fluids of the aforementioned Patnode et al. patent and Hyde et al. patent can be converted to silanol chain-stopped linear diorganopolysiloxanes by reaction with aqueous sodium bicarbonate. While reproducibility of silanol chain-stopped fluids is accomplished by this process, it is extremely difficult to prepare silanol chain-stopped fluids of a viscosity in excess of about 1,000 centistokes when measured at 25° C.

The present invention is based on our discovery that linear silanol chain-stopped diorganopolysiloxanes having the viscosity in excess of 1,000 centistokes when measured at 25° C., can be readily and reproducibly prepared by effecting reaction between (1) a cyclic diorganopolysilane and (2) a member selected from the class consisting of diphenylsilanediol and a linear silanol chain-stopped diorganopolysiloxane having a viscosity below about 1,000 centistokes when measured at 25° C.

The cyclic diorganopolysiloxanes which are employed in the practice of the present invention are well known in the art, and include compositions having the formula:

(1) $[(R_2)SiO]_n$ where $n$ is an integer equal to from 3 to 9, inclusive and preferably from 3 to 5, inclusive, and R represents monovalent organic radicals. Among the monovalent organic radicals represented by R are monovalent hydrocarbon radicals, halogenated monovalent hydrocarbon radicals, and cyanoalkyl radicals. More particularly, examples of radicals within the scope of R include alkyl radicals, e.g., methyl, ethyl, propyl, butyl, octyl, etc. radicals; aryl radicals, e.g., phenyl, naphthyl, xylyl, tolyl, etc. radicals; arylalkyl radicals, e.g., benzyl, phenylethyl, etc. radicals; halogenated monovalent hydrocarbon radicals, e.g., chloromethyl, chlorophenyl, dibromophenyl, tetrachlorophenyl, chloronaphthyl, etc. radicals; cyanoalkyl radicals, e.g., cyanomethyl, alpha-cyanoethyl, beta-cyanoethyl, beta-cyanopropyl, gamma-cyanopropyl, etc. radicals; cycloaliphatic radicals, e.g., cyclohexyl, cycloheptyl, etc. radicals; and alkenyl radicals, e.g., vinyl, allyl, alpha-methylvinyl, beta-methylvinyl, etc. radicals.

Specific examples of cyclic diorganopolysiloxanes which are particularly useful in the practice of the present invention include octamethylcyclotetrasiloxane, the methylphenylsiloxane tetramer, the methylethylsiloxane tetramer, the methyl-beta-cyanoethylsiloxane tetramer, the methylvinylsiloxane tetramer, etc. In addition to employing a single cyclic diorganopolysiloxane within the scope of formula 1, it is also possible to employ mixtures of several of such cyclic diorganopolysiloxanes. In the preferred embodiment of our invention, at least 50 mole percent of the silicon-bonded organic groups in the cyclic diorganopolysiloxane or cyclic diorganopolysiloxane mixture are methyl radicals. The preparation of the cyclic diorganopolysiloxanes of Formula 1 is well known in the art and will not be discussed in detail in the present application. In general, these cyclic diorganopolysiloxanes are prepared by hydrolyzing a diorganodichlorosilane to form a mixture of linear and cyclic diorganopolysiloxanes and the cyclic diorganopolysiloxanes are separated from the mixture by fractional distillation.

The low molecular weight silanol chain-stopped linear diorganopolysiloxanes employed as starting materials in the practice of the present invention have the formula:

(2) 

where R is as previously defined and $m$ has a value of from about 5 to 100. These hydroxylated diorganopolysiloxanes are relatively low molecular weight materials and preferably have a viscosity of from about 3 to 100 centistokes when measured at 25° C. However, within the scope of the starting silanol chain-stopped linear diorganopolysiloxane fluids of the present invention are those having viscosities up to about 1,000 centistokes when measured at 25° C.

The preparation of these low molecular weight linear silanol chain-stoped diorganopolysiloxanes of Formula 2 is well known in the art and for the preparation of these materials reference is made to the disclosure of Patents 2,416,503, Trautman et al., 2,607,792, Warrick, 2,890,188, Konkle et al., and 2,843,555, Berridge.

It should be noted that the R groups of the low molecular weight silanol chain-stopped linear diorganopolysiloxane of Formula 2 can all be the same radical or can be mixtures of various radicals. Thus, the diorganopolysiloxane portion of the silanol chain-stopped linear diorganopolysiloxane can be, for example, a dimethylpolysiloxane, a methylethylpolysiloxane, a methylphenylpolysiloxane, a methylvinylpolysiloxane, a methyl-beta-cyanoethylpolysiloxane, a methyltetrachlorophenylpolysiloxane, etc. In addition, the diorganopolysiloxane portion of the silanol chain-stopped linear diorganopolysiloxane can actually be a copolymer of various types of siloxane units. For example, the diorganopolysiloxane can be a copolymer of dimethylsiloxane units, methylphenylsiloxane units, methylvinylsiloxane units, and methyl-beta-cyanoethylsiloxane units. Such a copolymeric material can be prepared by hydrolyzing a mixture of dimethyldichlorosilane, methylphenydichlorosilane, methylvinyldichlorosilane, and methyl-beta-cyanoethyldichlorosilane to form a hydrolyzate and then reacting the hydrolyzate with a minor amount of a basic siloxane rearrangement and condensation catalyst, such as potassium hydroxide in the amount of 10 parts per million potassium hydroxide per part of hydrolyzate to form a copolymeric gum having a viscosity in excess of one million centistokes when measured at 25° C. This gum can then be converted to a silanol chain-stopped linear diorganopolysiloxane having the various copolymerized diorganosiloxane units by placing the gum in a bomb and subjecting the bomb to steam at a pressure of about 300 p.s.i. for about 2 hours. During this time the steam at high pressure will cleave siloxane units to form silanol chain-stopped low molecular weight linear diorganopolysiloxanes.

A still further method for preparing the low molecular weight silanol chain-stopped linear diorganopolysiloxanes within the scope of Formula 2 is by the aforementioned hydrolysis of chlorine chain-stopped diorganopolysiloxanes employing sodium bicarbonate as described above. This sodium bicarbonate hydrolysis can be employed to prepare fluids within the scope of Formula 2 which are either homopolymeric or copolymeric.

In addition to using diphenylsilanediol alone or the fluid of Formula 2 alone in the process of the present invention, mixtures of the two materials can be used with satisfactory results.

The silanol chain-stopped linear diorganopolysiloxanes having a viscosity in excess of 1,000 centistokes when measured at 25° C. have the formula:

(3) 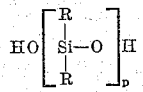

where R is as previously defined and $p$ has a value of from about 100 to 10,000. It should be noted that while a particular range has been given for the value of $p$, the controlling characteristic of the fluids prepared by the process of the present invention is the viscosity in excess of 1,000 centistokes. Since the viscosity of such a product is dependent upon both the number of siloxane units in the chain as well as the type of silicon-bonded organic substituents on the chain, it should be apparent to those skilled in the art that for a given type of organo substituent on the silicon atom, the minimum value of $p$ can be different from that described above. For example, when a substantial proportion of the silicon-bonded organic radicals are phenyl radicals, a higher viscosity is obtained for a given chain length than when the silicon-bonded organic radicals are all methyl radicals. In the preferred fluids prepared by the process of the present invention, at least 50 percent of the silicon-bonded organic groups in the siloxane of Formula 3 are methyl radicals.

The type and ratio of the various silicon-bonded organic radicals of the high molecular weight silanol chain-stopped diorganopolysiloxane of Formula 3 is, of course, dependent upon the nature of the starting cyclic diorganopolysiloxanes within the scope of Formula 1 as well as the nature of the material which is reacted with these cyclic diorganopolysiloxanes. For example, when the starting cyclic material within the scope of Formula 1 is octamethylcyclotetrasiloxane and this material is reacted with a low molecular weight silanol chain-stopped dimethylpolysiloxane within the scope of Formula 2 it is apparent that the product within the scope of Formula 3 will contain as organic radicals only methyl groups. On the other hand, if octamethylcyclotetrasiloxane is reacted with diphenylsilanediol, the products within the scope of Formula 3 will be a dimethylsiloxane which is chain-stopped with diphenylsilanol groups.

The process of the present invention is in effect an equilibration reaction in which the cyclic diorganopolysiloxane of Formulaa 1 is equilibrated with either diphenylsilanediol or with the low molecular weight silanol chain-stopped linear diorganopolysiloxane of Formula 2. As with all equilibration reactions, the ratio of the various reactants is adjusted so that the final product will have the desired viscosity. In the case of the equilibration reaction of the present invention, the organopolysiloxane of Formula 3 is chain-stopped by diorganosilanol groups. Since the source of diorganosilanol chain-stopping groups is the diphenylsilanediol or the low molecular weight hydroxylated silane of Formula 2, the length of the siloxane chain and its viscosity can be predetermined by a knowledge of the diorganosilanol content of the equilibration reaction mixture which contains both the cyclic diorganopolysiloxane and the hydroxylated material. For example, if the viscosity and chain length of the desired material within the scope of Formula 3 is determined, its silanol content can be calculated and an equilibration reaction mixture is then prepared which contains this same silanol content and equilibration is effected to produce the desired product within the scope of Formula 3. For example, when it is desired to prepare a diphenylsilanol chain-stopped copolymer of diphenylsiloxane units and dimethylsiloxane units having the formula:

(4) 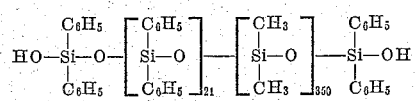

by equilibrating diphenylsilanediol with octamethylcyclotetrasiloxane and octaphenylcyclotetrasiloxane, the proportions of reactants are selected so that they are equilibrated in a reaction mixture containing the ingredients in the ratio of two moles of diphenylsilanediol, twenty-one moles of diphenylsiloxane units from octaphenylcyclotetrasiloxane and three hundred fifty moles of dimethylsiloxane units from octamethylcyclotetrasiloxane. This fluid has a viscosity of 27,000 centistokes when measured at 25° C.

A number of methods are available for determining the silanol content of the low molecular weight silanol chain-stopped diorganopolysiloxanes of Formula 2 and of the high molecular weight final products of Formula 3. One of the most useful of these methods is the conventional Zerewitinoff method. These silanol contents can also be determined by a conventional Karl Fischer procedure as well as by infrared analysis.

The equilibration reaction by which the products of Formula 3 are formed is well known in the art and is effected by heating the equilibration reaction mixture in the presence of an alkaline siloxane rearrangement and condensation catalyst, which catalyst is also well known in the art. The temperature at which reaction is effected can vary within wide limits depending on the particular alkaline siloxane rearrangement and condensation catalyst employed. For example, the equilibration can be effected at temperatures in the range of from about 80° C. to 180° C. with the reaction time varying from a few minutes up to a number of hours, such as 8 hours. Preferably, the equilibration reaction is carried out at a temperature in the range of from 105 to 180° C. with equilibration times of the order of from 1 to 6 hours. Because of the fact that the equilibration reaction of the present invention is designed to introduce a controlled amount of silanol groups into the organopolysiloxane, it it important for reproducibility of results that the reaction be carried out under substantially anhydrous conditions. By substantially anhydrous conditions is meant conditions in which there are present no more than about 10 parts of free water per million parts of the equilibration mixtures. While excellent control of the silanol content of the resulting product is obtained under these substantially anhydrous reaction conditions as described above, it should be noted that when precise control of the silanol content of the final product is not critical, the reaction can be effected with substantially more water present in the reaction mixture than the 10 parts per million recited above. Under these conditions the amount of water present in the reaction mixture should be equivalent to no more than 5 moles of water per 100 moles of silanol groups in the diphenylsilanediol or the low molecular weight silanol chain-stopped diorganopolysiloxane of Formula 2.

As an illustration of the many types of alkaline siloxane rearrangement and condensation catalysts which can be employed in the equilibration reaction of the present invention, reference is made to Patent 2,739,952, Linville, which is incorporated by reference into the present application for purposes of disclosing some of the many types of alkaline siloxane rearrangement and condensation catalysts. Other siloxane rearrangement and condensation catalysts are described in Patent 2,883,366, Kantor et al., which is incorporated by reference into the present application for the disclosure of quaternary phosphonium compounds as alkaline rearrangement and condensation catalysts for siloxanes.

The preferred alkaline siloxane rearrangement catalysts employed in the practice of the present invention are the alkali-metal hydroxides such as cesium hydroxide and potassium hydroxide as well as the quaternary phosphonium hydroxides of the Kantor et al. patent. In addition to employing these preferred catalysts in their pure state, these materials can also be employed as siloxanolate salts of the particular catalysts.

The amount of alkaline siloxane rearrangement catalyst employed is not critical and can vary within extremely wide limits. For example, satisfactory equilibration is effected employing from about 1 to 10,000 parts of catalyst per million parts of the equilibration reaction mixture. However, for optimum results it is preferred that the catalyst be present in an amount equal to from about 3 to 10 parts per million parts of the siloxane equilibration reaction mixture.

In order that those skilled in the art may better understand how the present invention can be practiced, the following examples are given by way of illustration and not by way of limitation. All parts are by weight.

*Example 1*

To a reaction vessel were added 13,600 parts octamethylcyclotetrasiloxane, 2,020 parts of octaphenylcyclotetrasiloxane, and the mixture was heated to 165° C. and purged with dry nitrogen to reduce the free water content to less than 10 parts per million. Ten parts of cesium hydroxide were then added per million parts of the mixture while maintaining the reaction vessel at 165° C. Finally, 216 parts of diphenylsilanediol was added and the reaction mixture was maintained for 6 hours at 165° C. At the end of this time the reaction mixture was allowed to cool and the resulting product was a silanol chain-stopped linear dimethylsiloxane diphenylsiloxane copolymer having the average composition set forth in Formula 4 above and having a viscosity of 27,000 centistokes when measured at 25° C.

*Example 2*

Following the procedure of Example 1, a reaction vessel was charged with 13,600 parts of octamethylcyclotetrasiloxane and heated to 165° C. and a nitrogen purge was used to reduce the water content to less than 10 parts per million. To this substantially anhydrous charge was added 17 parts of potassium hydroxide per million parts of octamethylcyclotetrasiloxane, 31 parts of tetramethyltetravinylcyclotetrasiloxane, and 2,020 parts of octaphenylcyclotetrasiloxane. When the octaphenylcyclotetrasiloxane had dissolved in the reaction mixture, 23 parts of diphenylsilanediol was added and the reaction mixture was allowed to stay at 165° C. for 6 hours. At the end of this time the reaction mixture was cooled, yielding a diphenylsilanol chain-stopped linear copolymer of dimethylsiloxane units, diphenylsiloxane units, and methylvinylsiloxane units. This product was a gum having a viscosity of about 800,000 centistokes when measured at 25° C.

*Example 3*

Following the procedure of Example 1, a diphenylsilanol chain-stopped copolymer of dimethylsiloxane units and methyl-beta-cyanoethylsiloxane units having a viscosity of about 20,000 centistokes when measured at 25° C. is prepared by charging a reaction vessel with a mixture of 15,000 parts of octamethylcyclotetrasiloxane, 2,000 parts of the methyl-beta-cyanoethylsiloxane tetramer and 225 parts of diphenylsilanediol. This mixture is heated to a temperature of 110° C. and purged with dry nitrogen to reduce the moisture content to below 10 parts per million of water. Eight parts per million of tetrabutyl phosphonium hydroxide is then added to this reaction mixture which is maintained at a temperature of 110° C. for 2 hours to obtain the desired reaction product.

*Example 4*

A silanol chain-stopped linear dimethylpolysiloxane containing 3 percent by weight of hydroxyl groups and having a viscosity of about 10 centistokes when measured at 25° C. was prepared from the chlorine chain-stopped dimethylpolysiloxane fluid containing an average of 15.4 silicon atoms per molecule. This chlorine chain-stopped oil was prepared by the method of Patent 2,381,366, Patnode et al. This chlorine-chain-stopped oil (150 parts) was mixed with vigorous stirring into a slurry of 75 parts of sodium bicarbonate in 100 parts of acetone. The stirring was continued for about ½ hour after the addition, at which time the mixture was filtered leaving a clear, pale yellow solution. The acetone was then stripped out to yield the desired product.

To a reaction vessel was added 50 parts of octamethylcyclotetrasiloxane which was heated to 150° C. and purged with dry nitrogen to remove any dissolved moisture. At this time, 10 parts of potassium hydroxide per million parts of octamethylcyclotetrasiloxane and 0.29 part of the silanol chain-stopped dimethylpolysiloxane described above were added. The reaction mixture was allowed to stay at 150° C. for 4 hours and then cooled to yield a clear, colorless oil which was a silanol chain-stopped linear dimethylpolysiloxane having a viscosity of about 600,000 centistokes at 25° C.

Example 5

Following the procedure of Example 1 of Patent 2,843,555, Berridge, a room temperature vulcanizing silicone rubber was prepared by mixing 100 parts of the silanol chain-stopped dimethylpolysiloxane fluid prepared in Example 4 with 20 parts diatomaceous earth, 20 parts zinc oxide, 30 parts calcined clay and 2 parts of a liquid, water-insoluble hydrolysis product of tetraethylsilicate. To the foregoing mixture was added 2 parts of a tin octoate solution in mineral spirits (0.6 part tin). This mixture set to a firm rubbery product having good tensile strength and elongation in about 5 minutes at room temperature.

While the foregoing examples have of necessity been limited to only a few of the many variables within the scope of the present invention, it should be noted that the process of the present invention is applicable to the preparation of silanol chain-stopped linear diorganopolysiloxanes containing a wide variety of silicon-bonded organic groups and having a wide viscosity range, such as a viscosity of from about 1,000 up to about 50,000,000 centistokes when measured at 25° C. The nature of the final product will, as heretofore mentioned, depend on the particular organic substituents in the silanol chain-stopped material and on the molecular weight or chain length of the polydimethylsiloxane chain. A wide variety of reaction conditions and catalyst levels can be employed in the equilibration reaction. While the examples have described the use of atmospheric pressure for effecting the reaction, it should be understood that the reaction can be effected at pressures below atmospheric as well as at super-atmospheric pressures, although atmospheric pressure is preferred.

What we claim as new and desire to secure by Letters Patent of the United States is:

1. The process of preparing a linear silanol chain-stopped diorganopolysiloxane having a predetermined silanol content and having a viscosity in excess of 1,000 centistokes and up to about 50,000,000 centistokes when measured at 25° C., which consists essentially of heating under substantially anhydrous conditions and in contact with an alkaline organopolysiloxane rearrangement and condensation catalyst (1) a cyclic diorganopolysiloxane having from 3 to 9 diorganosiloxane units per molecule with (2) a member selected from the class consisting of diphenylsilanediol and a linear silanol chain-stopped diorganopolysiloxane having a viscosity below about 1,000 centistokes when measured at 25° C., the ratio of (1) to (2) being selected so as to provide said predetermined silanol content, and the organo groups of said diorganopolysiloxane being selected from the class consisting of monovalent hydrocarbon radicals, halogenated monovalent hydrocarbon radicals and cyanoalkyl radicals.

2. The process of preparing a linear silanol chain-stopped diorganopolysiloxane having a predetermined silanol content and having a viscosity in excess of 1,000 centistokes and up to about 50,000,000 centistokes when measured at 25° C., which process consists essentially of heating under substantially anhydrous conditions and in contact with an alkaline organopolysiloxane rearrangement and condensation catalyst (1) a cyclic diorganopolysiloxane having from 3 to 9 diorganosiloxane units per molecule with (2) a member selected from the class consisting of diphenylsilanediol and a linear silanol chain-stopped diorganopolysiloxane having a viscosity below about 1,000 centistokes when measured at 25° C., the proportions of (1) and (2) being selected so as to provide said predetermined silanol content, and the organo groups of said diorganopolysiloxane being selected from the class consisting of monovalent hydrocarbon radicals, halogenated monovalent hydrocarbon radicals and cyanoalkyl radicals.

3. The process of preparing a linear diphenylsilanol chain-stopped dimethylpolysiloxane having a predetermined silanol content and having a viscosity in excess of 1,000 centistokes and up to about 50,000,000 centistokes when measured at 25° C., which process consists essentially of heating under substantially anhydrous conditions a cyclic dimethylpolysiloxane having from 3 to 9 dimethylsiloxane units per molecule with diphenylsilanediol in the presence of an alkaline organopolysiloxane rearrangement and condensation catalyst, the proportions of said cyclic dimethylpolysiloxane and said diphenylsilanediol being selected to provide said predetermined silanol content.

4. The process of preparing a linear silanol chain-stopped dimethylpolysiloxane having a predetermined silanol content and having a viscosity in excess of 1,000 centistokes and up to about 50,000,000 centistokes when measured at 25° C. which consists essentially of heating under substantially anhydrous conditions and in contact with an alkaline organopolysiloxane rearrangement and condensation catalyst (1) a cyclic dimethylpolysiloxane containing from 3 to 9 dimethylsiloxane units per molecule with (2) a linear silanol chain-stopped dimethylpolysiloxane having a viscosity below about 1,000 centistokes when measured at 25° C., the proportions of (1) and (2) being selected so as to provide said predetermined silanol content.

5. The process of preparing a linear silanol chain-stopped copolymer of dimethylsiloxane units, diphenylsiloxane units and methylvinylsiloxane units having a predetermined silanol content and having a viscosity in excess of 1,000 centistokes and up to about 50,000,000 centistokes when measured at 25° C., which process consists essentially of heating under substantially anhydrous conditions in contact with a catalytic amount of potassium hydroxide, diphenylsilanediol with a mixture of octamethylcyclotetrasiloxane, octaphenylcyclotetrasiloxane and tetramethyltetravinylcyclotetrasiloxane, the proportions of said diphenylsilanediol and said mixture being selected so as to provide said predetermined silanol content.

6. The process of preparing a linear silanol chain-stopped diorganopolysiloxane having a predetermined silanol content and having a viscosity in excess of 1,000 centistokes and up to about 50,000,000 centistokes when measured at 25° C., which process consists essentially of heating under substantially anhydrous conditions at a temperature of from 80 to 180° C. in contact with a catalytic amount of an alkaline organopolysiloxane rearrangement and condensation catalyst (1) a cyclic diorganopolysiloxane containing from 3 to 9 diorganosiloxane units per molecule with (2) a member selected from the class consisting of diphenylsilanediol and a linear silanol chain-stopped diorganopolysiloxane having a viscosity below about 1,000 centistokes when mesaured at 25° C., the proportions of (1) and (2) being selected so as to provide said predetermined silanol content, the organo groups of the diorganopolysiloxanes being selected from the class consisting of monovalent hydrocarbon radicals, halogenated monovalent hydrocarbon radicals and cyanoalkyl radicals.

References Cited in the file of this patent

UNITED STATES PATENTS

| 2,737,506 | Hurd et al. | Mar. 6, 1956 |
| 2,863,897 | Wehrly | Dec. 9, 1958 |
| 2,875,172 | Caprino | Feb. 24, 1959 |

FOREIGN PATENTS

| 114,058 | Australia | Oct. 30, 1941 |
| 203,314 | Australia | June 16, 1955 |